W. M. WEGMANN.
DIFFERENTIAL DRIVING MECHANISM.
APPLICATION FILED SEPT. 17, 1920.

1,403,994.

Patented Jan. 17, 1922.
2 SHEETS—SHEET 1.

Witness:
R. E. Hamilton

INVENTOR:
William M. Wegmann,
BY
F. G. Fischer,
ATTORNEY.

W. M. WEGMANN.
DIFFERENTIAL DRIVING MECHANISM.
APPLICATION FILED SEPT. 17, 1920.
1,403,994.
Patented Jan. 17, 1922.
2 SHEETS—SHEET 2.
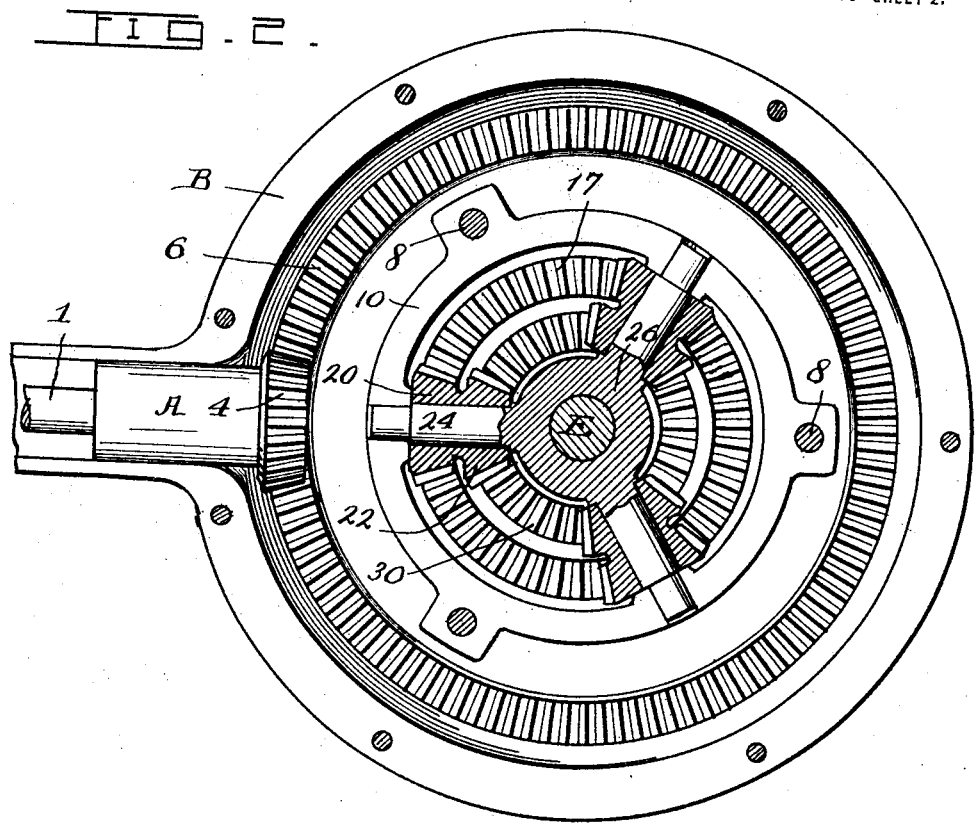
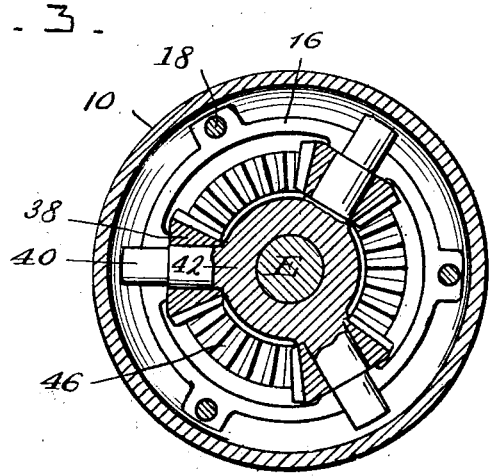
INVENTOR:
William M. Wegmann,
BY F. G. Fischer, Atty.

UNITED STATES PATENT OFFICE.

WILLIAM M. WEGMANN, OF BLADEN, NEBRASKA.

DIFFERENTIAL DRIVING MECHANISM.

1,403,994. Specification of Letters Patent. Patented Jan. 17, 1922.

Application filed September 17, 1920. Serial No. 410,890.

*To all whom it may concern:*

Be it known that I, WILLIAM M. WEGMANN, a citizen of the United States, residing at Bladen, in the county of Webster and State of Nebraska, have invented certain new and useful Improvements in Differential Driving Mechanism, of which the following is a specification.

My invention relates to drive mechanisms for self-propelled vehicles, such as automobiles, trucks, etc., and the invention pertains more particularly to the differential whereby power is transmitted from the propeller shaft to the rear axle shafts of the vehicle.

The principal object of the invention is to arrange the gears of the differential in such manner as to prevent spinning of any one of the rear or propeller wheels of the vehicle on striking a soft or slippery place in the road, thus overcoming skidding of the vehicle wheels and undue wear on the differential gears.

Other objects of the invention will hereinafter appear, and in order that said invention may be fully understood, reference will now be made to the accompanying drawings, in which:

Fig. 2 is a vertical section on line II—II of Fig. 1.

Fig. 3 is a detail vertical section on line III—III of Fig. 1.

Figure 1:
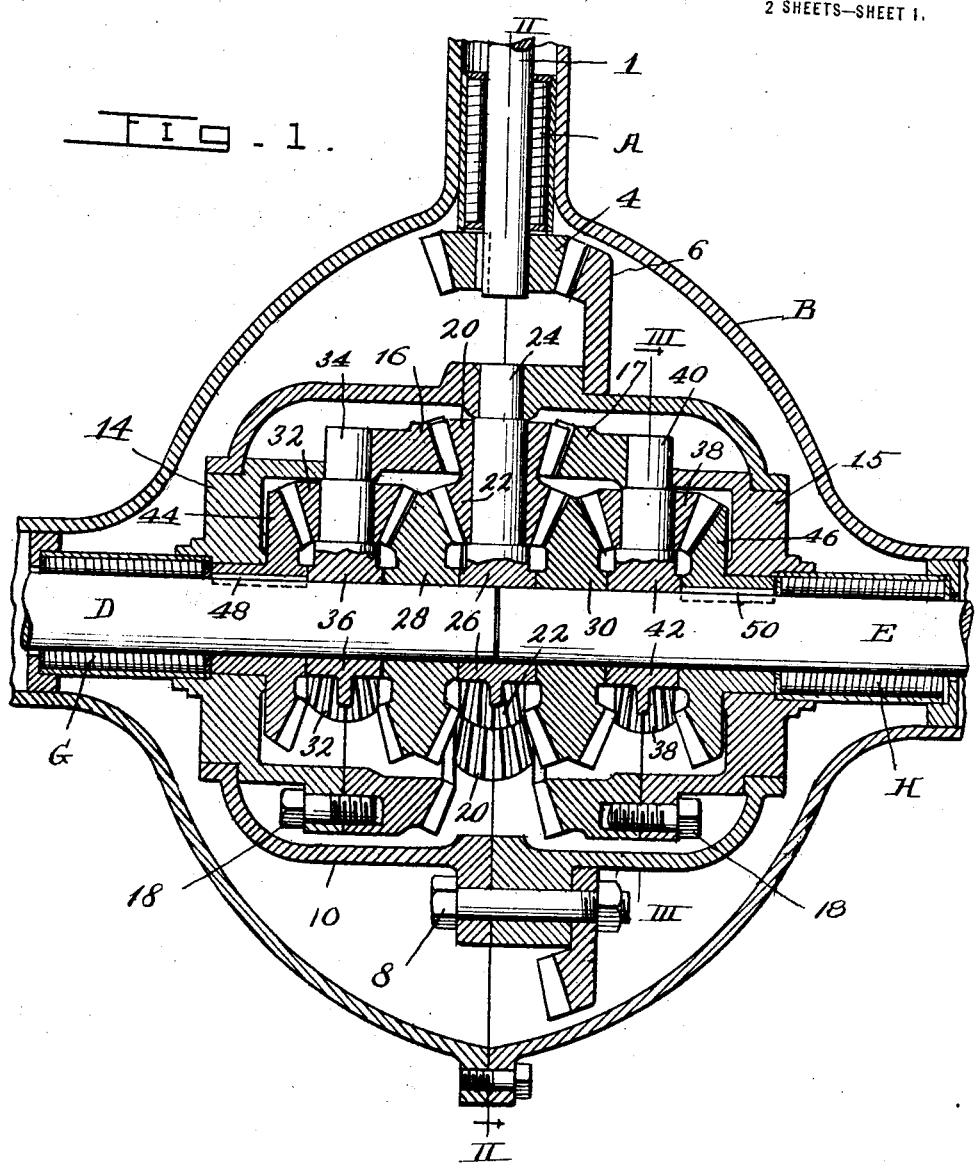
Fig. 1 is a horizontal section of the differential and the surrounding housing.

Referring now in detail to the various parts, 1 designates a drive shaft corresponding to the propeller shaft of a motor vehicle. Said shaft 1 is journaled in antifriction bearings A, mounted in the differential housing B.

D and E designate a pair of independent axle shafts fixed at their outer ends in the drive wheels of the vehicle, not shown, and journaled at their inner or adjacent ends in antifriction bearings G and H, respectively, mounted in the differential housing B.

4 designates a drive pinion keyed or otherwise fixedly mounted upon the drive shaft 1. Said drive pinion 4 intermeshes with a ring gear 6 secured by suitable means such as bolts 8 to a casing 10 rotatably arranged in the housing B. The casing 10 is preferably made in two sections connected by the bolts 8, for convenience in assembling the enclosed differential gears.

The casing 10 is journaled upon the hubs 14 and 15 of cup-shaped bevel gears 16 and 17, respectively, which are made in two sections connected by suitable means such as screws 18, for convenience in assembling a number of enclosed differential gears. The bevel gears 16 and 17 intermesh with three bevel gears 20 formed integral or otherwise rigidly connected to three similar bevel gears 22 all of which are journaled on three stub shafts 24 mounted in the casing 10 to rotate therewith. The three stub shafts 24 form part of a spider 26 journaled upon the adjacent ends of the axle shafts D and E, as disclosed on Fig. 1.

The bevel gears 22 intermesh with two intermediate bevel gears 28 and 30 arranged at opposite sides of the spider 26 and loosely mounted upon the axle shafts D and E, respectively. The intermediate gear 28 intermeshes with three bevel gears 32 journaled upon the stub shafts 34 of a spider 36 which is loosely mounted upon the axle shaft D. The intermediate gear 30 intermeshes with three bevel gears 38 journaled upon the stub shafts 40 of a spider 42, which is loosely mounted upon the axle shaft E. The stub shafts 34 and 40, are mounted in the cup-shaped bevel gears 16 and 17, respectively, to rotate therewith. The bevel gears 32 and 38 intermesh with bevel gears 44 and 46, fixed upon the axle shafts D and E, by suitable means such as keys 48 and 50, respectively.

With the parts constructed and arranged as shown and described it will be understood that when the drive shaft 1 is in operation it will drive the pinion 4, which in turn drives the ring gear 6. As the ring gear 6 rotates, it carries the casing 10 around therewith, which in turn carries the spider 22 with the bevel gears 20 and 22 mounted thereon. As the bevel gears 20 and 22 are carried around by the spider 26, the bevel gears 20 being in mesh with the bevel gears 16 and 17, cause the same to revolve and in turn revolve the spiders 34 and 40 carrying the bevel gears 32 and 38, which rotate the bevel gears 44 and 46 fixed upon the axle shafts D and E, respectively. The intermediate gear 28 is carried around its axis by the intermeshing gears 22 and 32, while the intermediate gear 30 is carried around its axis by the intermeshing gears 22 and 38. In turning a corner we will assume that the greater resistance occurs on the axle shaft D. In this event, the casing 10 will rotate with the shaft E which offers the least resistance, and the bevel gears 20 and 22 will rotate on their stub shafts 24 and run around the surface of the bevel gears 16 and 28, respectively, thus permitting said bevel gears 16 and 28 to remain stationary or rotate at a lower speed than the shaft E. Likewise if the shaft E meets with greater resistance in going around a corner, the bevel gears 20 and 22 will travel around the bevel gears 17 and 30, respectively. When the vehicle is going straight ahead, the bevel gears 20 and 22 remain stationary on their stub shafts 24, and the bevel gear 20 being interlocked with the bevel gears 16 and 17 travels around therewith, while the bevel gear 22 travels around the intermediate gears 28 and 30. Should one of the drive wheels, say the one keyed upon the axle shaft D, strike a soft or slippery place in the road and start to spin around or skid, the frictional resistance offered by the gears enclosed within the casing 10 and the backward resistance offered by the gears 46, 38, 16 and 30 will tend to retard the speed of the gears 20 and 22 through the connections of said gears 20 and 22 with the axle shaft D retard the speed thereof, and thus overcome the tendency of its drive wheel to spin or skid as above stated.

From the foregoing description it will be understood that I have provided driving mechanism embodying the advantages above pointed out, and while I have shown and described the preferred construction, combination, arrangement and proportion of parts, I reserve the right to make such changes as properly fall within the spirit and scope of the claim.

Having thus described my invention, what I claim and desire to secure by Letters Patent, is:

In combination with a propeller shaft and a pair of axle shafts, a rotatable casing driven from said propeller shaft, a pair of oppositely-disposed cup-shaped gears surrounding the adjacent ends of the axle shafts and upon which the casing is journaled, two gears loosely mounted upon the axle shafts, a spider mounted within the casing to rotate therewith and disposed between the two last-mentioned gears, pairs of gears mounted on said spider, one of each pair meshing with the cup-shaped gears to drive the same and the other of each pair meshing with the two gears loosely mounted upon the axle shafts, a pair of gears fixed to the axle shafts to drive the same, two spiders loosely mounted upon the axle shafts, and gears mounted on the last-mentioned spiders and intermeshing with the two loose gears and the two fixed gears on the axle shafts, for the purpose described.

In testimony whereof I affix my signature, in the presence of two witnesses.

WILLIAM M. WEGMANN.

Witnesses:
O. L. LINDGREN,
OLEY IVERSON.